US007043522B2

(12) United States Patent
Olson et al.

(10) Patent No.: US 7,043,522 B2
(45) Date of Patent: May 9, 2006

(54) UNBOUNDED COMPUTING SPACE

(75) Inventors: Lance E. Olson, Sammamish, WA (US); Eric K. Zinda, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 728 days.

(21) Appl. No.: 10/156,936

(22) Filed: May 30, 2002

(65) Prior Publication Data
US 2003/0225822 A1    Dec. 4, 2003

(51) Int. Cl.
G06F 15/16    (2006.01)

(52) U.S. Cl. ........................................ 709/202; 709/205

(58) Field of Classification Search ................ 709/202, 709/201, 203, 205, 224
See application file for complete search history.

(56) References Cited

U.S. PATENT DOCUMENTS

| 5,136,708 | A | * | 8/1992 | Lapourtre et al. .......... 718/103 |
| 5,812,771 | A | * | 9/1998 | Fee et al. .................... 709/201 |
| 5,832,514 | A | | 11/1998 | Norin et al. |
| 6,009,456 | A | | 12/1999 | Frew et al. |
| 6,016,393 | A | | 1/2000 | White et al. |
| 6,055,562 | A | | 4/2000 | Devarakonda et al. |
| 6,065,039 | A | | 5/2000 | Paciorek |
| 6,065,040 | A | | 5/2000 | Mima et al. |
| 6,115,736 | A | | 9/2000 | Devarakonda et al. |
| 6,134,580 | A | | 10/2000 | Tahara et al. |
| 6,163,855 | A | | 12/2000 | Shrivastava et al. |
| 6,192,354 | B1 | | 2/2001 | Bigus et al. |
| 6,233,601 | B1 | | 5/2001 | Walsh |
| 6,282,563 | B1 | | 8/2001 | Yamamoto et al. |
| 6,282,582 | B1 | | 8/2001 | Oshima et al. |
| 6,330,588 | B1 | | 12/2001 | Freeman |
| 6,334,146 | B1 | | 12/2001 | Parasnis et al. |
| 6,782,398 | B1 | * | 8/2004 | Bahl .......................... 707/200 |
| 2003/0182460 | A1 | * | 9/2003 | Khare ........................ 709/310 |
| 2004/0205772 | A1 | * | 10/2004 | Uszok et al. ................ 719/317 |

OTHER PUBLICATIONS

Fielding et al, Hypertext Transfer Protocol—HTTP/1.1, Jun. 1999, The Internet Society, Request for Comments, 2616, pp. 35-36.*
United Devices, Inc.™, printed from http://www.ud.com/home.htm, Apr. 24, 2002, 1 page.

(Continued)

Primary Examiner—Rural Dharia
Assistant Examiner—Brian J. Gillis
(74) Attorney, Agent, or Firm—Banner & Witcoff, Ltd.

(57) ABSTRACT

An unbounded computing space including independent nodes is provided. Each node includes a discovery module to detect other nodes within the unbounded computing space, and an interaction module to communicate with the other detected nodes. Any node within the unbounded computing space can introduce an independent agent (e.g., an executable code assembly) into the unbounded computing space. The node in which an independent agent is introduced can subsequently send the independent agent to another node in the unbounded computing space for execution in the other node. Nodes in which an independent agent is introduced can define privileges that are associated with one or more agents and can be used to ensure the agent does not exceed a security policy as defined by the node. This allows for a distributed computing system in which an unlimited number of different agents can be introduced.

30 Claims, 4 Drawing Sheets

OTHER PUBLICATIONS

Products: MetaProcessor™ platform version 2.1, printed from http://www.ud.com/products/mp_platform.htm, Apr. 24, 2002, 2 pages.

Projects: Cancer Research, printed from http://members.ud.com/projects/cancer/, Apr. 24, 2002, 1 page.

Grid computing—printed from http://searchwebservices.techtarget.com/sDefinition/0,,sid26_gci773157,00.html, May 21, 2002, 3 pages.

B. Rostamzadeh et al., "DACAPO: A Distributed Computer Architecture for Safety-Critical Control Applications", Intelligent Vehicles '95 Symposium, Sep. 25-26, 1995, pp. 376-381.

J. Gosling, "The Feel of Java", IEEE Computer Society, Jun. 1997, pp. 53-57.

L. Goldschlager, "A Universal Interconnection Pattern for Parallel Computers", Journal of the Association for Computing Machinery, vol. 29, No. 3, Jul. 1982, pp. 1073-1086.

E. Krieger et al., *Models@Home: distributed computing in bioinformatics using a screensaver based approach,* Oxford University Press, Feb. 2002, vol. 18, No. 2, pp. 315-318.

D. Liang et al., "A fault-tolerant object service on CORBA", The Journal of Systems and Software, vol. 48, No. 3, Nov. 1999, pp. 197-211.

W. Reisig, "Distributed Algorithms: Modeling and Analysis with Petri Nets", IEEE International Conference on Systems, Man, And Cybernetics, vol. 1, 1998, pp. 38-43.

T. Mudge, "A Computer Architecture For Parallel Processing", University of Michigan, p. 596.

M. Portmann et al., "The Cost of Peer Discovery and Searching in the Gnutella Peer-to-peer File Sharing Protocol", IEEE, 2001, pp. 263-268.

N. Eng et al., "An Initial Approach of a Scalable Multicast-based Pure Peer-to-Peer System", IEEE Proceedings of the First International Conference on Peer-to-Peer Computing, Aug. 27, 2001, pp. 97-98.

A. Loo et al., "A peer-to-peer distributed selection algorithm for the Internet", Internet Research: Electronic Networking Applications and Policy, vol. 12, No. 1, 2002, pp. 16-30.

C. J. Anumba et al., "Collaborative design of structures using intelligent agents", Automation in Construction, 2002, pp. 89-103.

B. Boutsinas et al., "On distributing the clustering process", Pattern Recognition Letters, vol. 23, No. 8, 2002, pp. 999-1008.

* cited by examiner

UNBOUNDED COMPUTING SPACE

FIELD OF THE INVENTION

The invention generally relates to distributed computing architectures. More specifically, the invention relates to an unbounded computing space that dynamically alters composition as computers are added or removed from the computing space.

BACKGROUND OF THE INVENTION

Distributed computing systems are generally known in the art. However, known distributed computing systems such as grid computing systems typically divide a single large computing task into sub-tasks, and each participant in the grid computing system performs or solves only the sub-task that it was given. In addition, each distributed computer generally only works on its assigned sub-task when its processor or other resources necessary to the sub-task would otherwise be idle. In addition, each distributed computer node is required to trust a central authority to execute code on the node's machine with little control over what that code is able to do.

For example, one known distributed computing system is the Intel-United Devices Cancer Research Project sponsored by United Devices, Inc. of Austin, Tex. and Intel Corporation of Santa Clara, Calif. The Cancer Research Project allows PC owners to volunteer idle processor time on their own computers to help find a cure for cancer. Each user downloads a software client that periodically receives a research sub-task from a server, and performs the sub-task when the local computer processor would otherwise be idle. Upon completion of the sub-task, the local client sends the results to the server, and receives a new sub-task. At all times the local client is dependent on the central server that divides the task into sub-tasks and assigns sub-tasks to volunteer client machines. In addition, each client does not contribute to the computing space except that the client performs an assigned sub-task. That is, each client only executes sub-tasks defined by the server; each client is not capable of executing any arbitrary application program. Finally, the nodes must rely on United Devices to ensure that code or data coming from the server will execute in a manner that will not harm other components of the machine, such as by deleting or altering data on the hard drive. This known system is bounded by the ability of the central server to assign sub-tasks to each of the nodes for processing.

Another known pseudo-distributed computing space is demonstrated by online roll-playing games such as Ultima Online®. In an online roll-playing game (RPG), each remote user typically must log in to a central server that administers and oversees the game play of the RPG. The virtual world in which characters live is defined by and maintained by the central server, and appears identical to each remote client (player characters) connected to that central server. In addition, all interaction between players goes through the central server. Thus, while online RPGs may be thought of as distributed computing environments, they are in fact large client-server applications, and users are not allowed to introduce executable elements into the system.

Thus, it would be an advancement in the art to provide a computing space in which programs could run on any computer without being dependent on a central server, where the computer running the program can do so without concern for violation of other resources on the system, and in which each computer is part of and defines an overall computing space. It would be a further advancement in the art if the computing space were unbounded such that the computing space is potentially defined by an unlimited number of participating computers.

BRIEF SUMMARY OF THE INVENTION

The inventive method and system overcome the problems of the prior art by providing an unbounded computing space that includes multiple interconnected computer systems on which a program agent can run in a manner that allows the computer systems to define privileges that may be granted to each program agent. Agent programs can be sent between nodes and safely execute on each machine, regardless of each agent's origin (trusted versus untrusted source). That is, any node within the computing space can introduce a program agent that can be sent to and run on any other node in the computing space. Each node may use a detection module to learn about other nodes within the unbounded computing space, and an interaction module to communicate with other nodes within the unbounded computing space, including sending and receiving program agents between nodes.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

Aspects of the present invention provide an unbounded computing space in which agent programs can execute. One or more aspects of the invention are applicable to any general purpose computing platform capable of running a variety of operating systems, virtual machines, and applications, including PCs running WINDOWS®, LINUX®, MacOS®, or SOLARIS® brand operating systems and the like, as well as PDA devices, Tablet PCs, pen-based computers, and other data processing systems.

Figure 1:
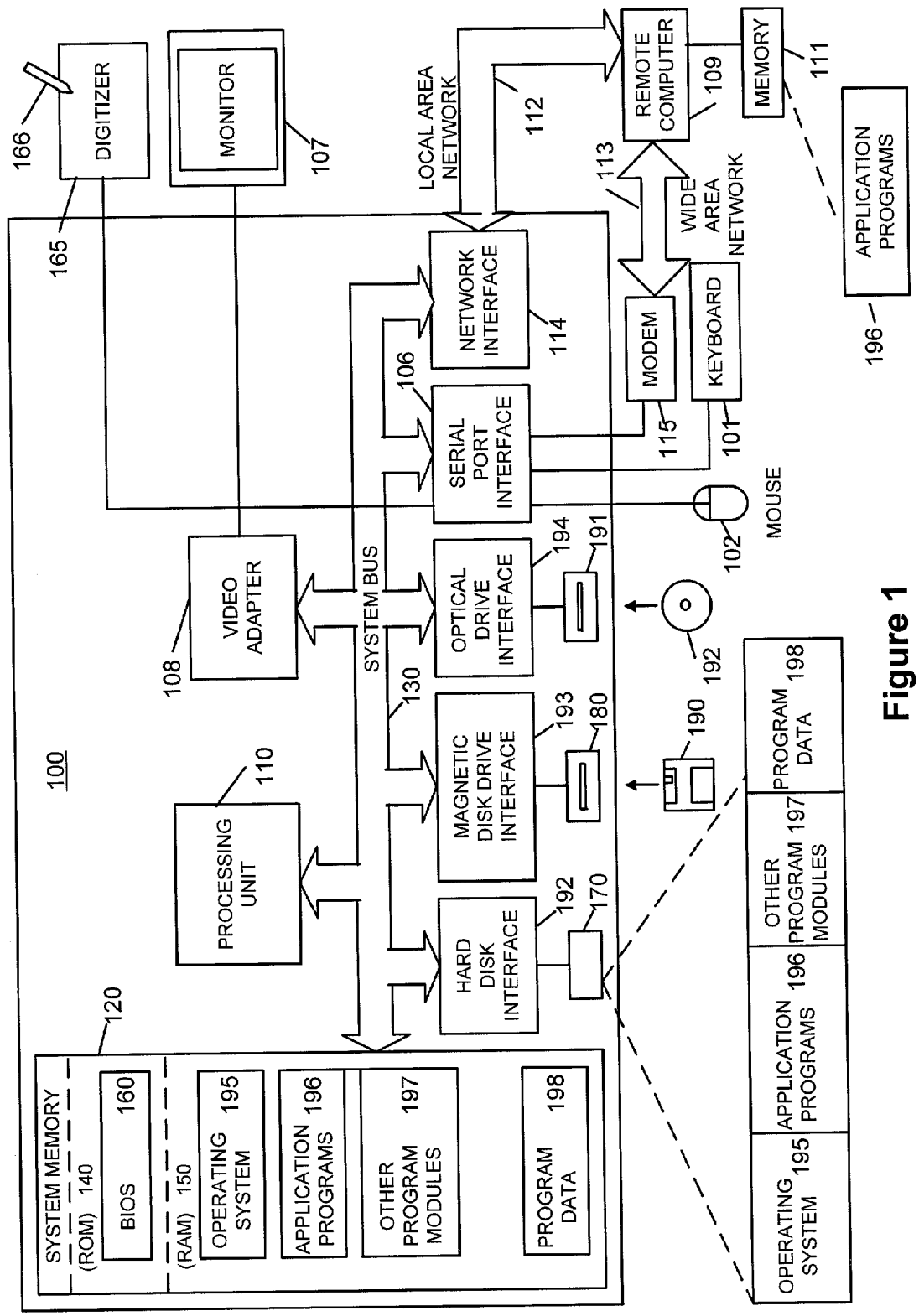
FIG. 1 illustrates a schematic diagram of an exemplary general-purpose digital computing environment that may be used to implement various aspects of the present invention.

FIG. 1 illustrates a schematic diagram of an exemplary conventional general-purpose digital computing environment that may be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules, and other data for the personal computer 100. It will be appreciated by those skilled in the art that other types of computer readable media that may store data that is accessible by a computer, such as magnetic cassettes, flash memory cards, digital video disks, Bernoulli cartridges, random access memories (RAMs), read only memories (ROMs), and the like, may also be used in the example operating environment. It will also be appreciated that one or more aspects of the invention may be implemented using software, hardware, or a combination of the two.

A number of program modules may be stored on the hard disk drive 170, magnetic disk 190, optical disk 192, ROM 140, or RAM 150, including an operating system 195, one or more application programs 196, other program modules 197, and program data 198. A user may enter commands and information into the computer 100 through input devices, such as a keyboard 101 and a pointing device 102. Other input devices (not shown) may include a microphone, joystick, game pad, satellite dish, scanner, or the like. These and other input devices often are connected to the processing unit 110 through a serial port interface 106 that is coupled to the system bus 130, but may be connected by other interfaces, such as a parallel port, game port, or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor 107, personal computers typically include other peripheral output devices (not shown), such as speakers and printers. As one example, a pen digitizer 165 and accompanying pen or user input device 166 are provided in order to digitally capture freehand input. The pen digitizer 165 may be coupled to the processing unit 110 via the serial port interface 106 and the system bus 130, as shown in FIG. 1, or through any other suitable connection. Furthermore, although the digitizer 165 is shown apart from the monitor 107, the usable input area of the digitizer 165 may be co-extensive with the display area of the monitor 107. Further still, the digitizer 165 may be integrated in the monitor 107, or may exist as a separate device overlaying or otherwise appended to the monitor 107.

The computer 100 may operate in a networked environment using logical connections to one or more remote computers, such as a remote computer 109. The remote computer 109 may be a server, a router, a network PC, a peer device, or other common network node, and typically includes many or all of the elements described above relative to the computer 100, although only a memory storage device 111 with related applications programs 196 have been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet.

When used in a LAN networking environment, the computer 100 is connected to the local network 112 through a network interface or adapter 114. When used in a WAN networking environment, the personal computer 100 typically includes a modem 115 or other means for establishing a communications link over the wide area network 113, e.g., to the Internet. The modem 115, which may be internal or external, is connected to the system bus 130 via the serial port interface 106. In a networked environment, program modules depicted relative to the personal computer 100, or portions thereof, may be stored in a remote memory storage device.

It will be appreciated that the network connections shown are exemplary and other techniques for establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Figure 2:
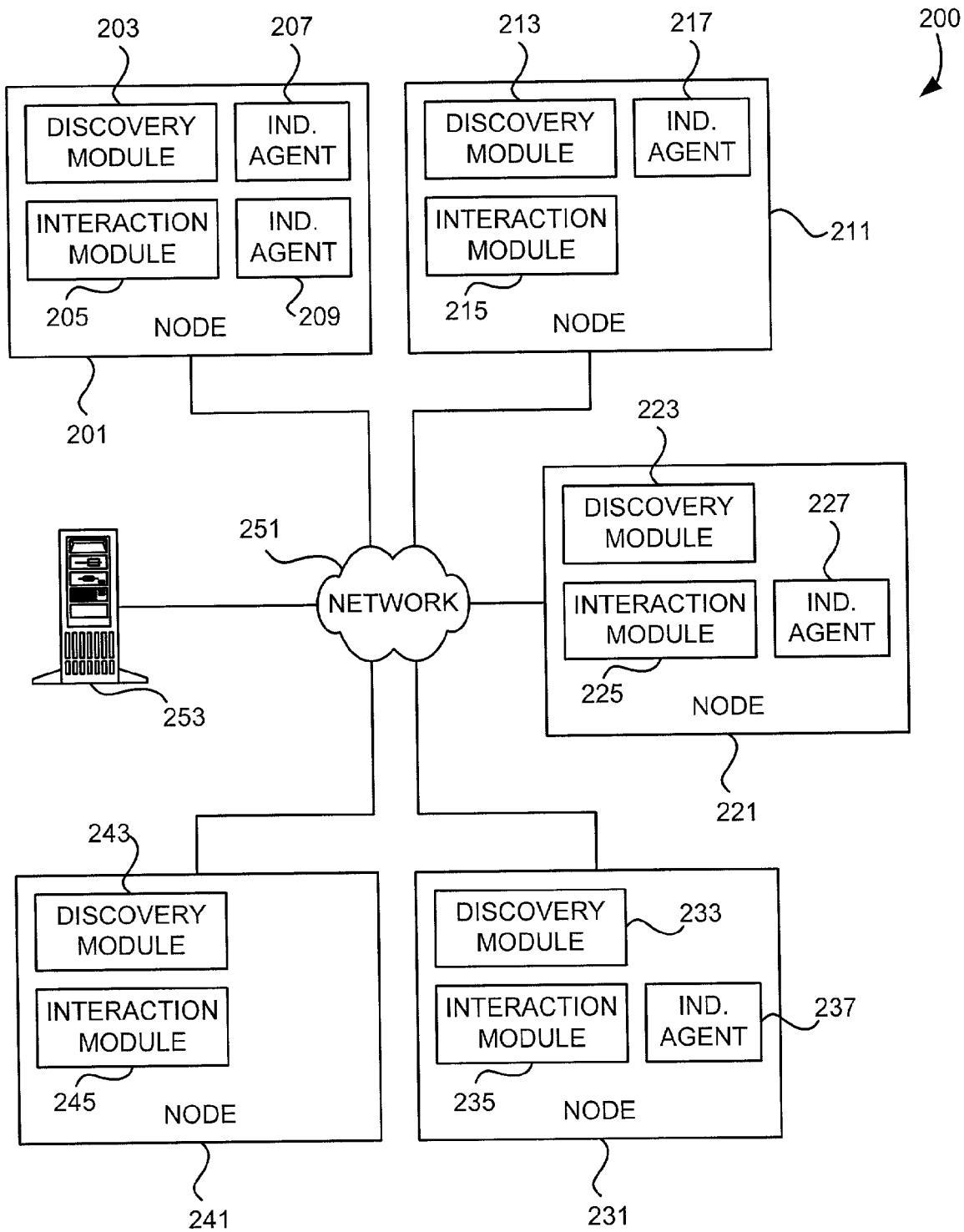
FIG. 2 illustrates a schematic diagram of an unbounded computer space according to an illustrative embodiment of the invention.

With reference to FIG. 2, a symmetric multi-processing unbounded computing space can be created by leveraging idle processing time on networked computers, combined with sufficient security and sandbox mechanisms to allow execution of code from potentially untrusted sources. Each node in the computing space may have a detection mechanism to discover other nodes in the computing space. As a result, new nodes may by dynamically added and removed without being required to register with a central server, and any user can introduce executable code into the computing space.

An unbounded computing space (UCS) 200 includes one or more independent nodes 201, 211, 221, 231, 241. Each node that is a part of the UCS 200 provides an environment in which software programs, referred to as independent agents, can run. That is, each node acts as an execution shell for independent agents. In addition, because each node added to UCS 200 may have a different configuration from the other nodes (e.g., varying software, resources, security policy, hardware, attached peripheral devices, etc.), each node provides a unique computing space. Thus, two different nodes executing the same independent agent may yield different results.

Each node in the unbounded computing space may be thought of similar to a plot of land, with unique characteristics, that executes independent agents received from other nodes within the UCS. Thus, as each node is added to the UCS 200, e.g., by launching node application software, the environment in which independent agents can run increases. Likewise, as nodes are removed from the UCS 200 (e.g., as a result of a user closing the node application program executing on a computer system), the environment in which independent agents can run decreases.

The individual nodes that make up the unbounded computing space might not be dependent on a server for the receipt of independent agent software modules. That is, each node in the unbounded computing space can introduce an independent agent, which may subsequently be copied or transferred to another node within the unbounded computing space.

A node 201 in unbounded computing space 200 includes a discovery module 203 and interaction module 205, and often (but not always) includes one or more independent agents 207, 209. Node 201 calls discovery module 203 to detect other nodes within the unbounded computing space, and calls interaction module 205 to interact with the other detected nodes, e.g., by sending an independent agent to another node. As stated above, independent agent 207, 209 is a code assembly that uses the interaction module to travel to and execute on another node or nodes within the unbounded computing space to perform a function. Independent agents can be transported or copied from one node to another, optionally maintaining state information between nodes. It is also possible that an agent does not travel from one node to another, and instead executes only in the node in which it was introduced.

Unbounded computing space 200 may also include additional nodes 211, 221, 231, 241, with respective discovery modules 213, 223, 233, 243, interaction modules 215, 225, 235, 245, and independent agents 217, 227, 237. Nodes, generally, are embodied in computer systems interconnected via a network 251 such as the Internet, a LAN, WAN, intranet, etc. Each node may vary in composition from system to system, provided each node can understand the other nodes within the unbounded computing space, e.g., by using a common communication protocol. That is, each node can use a unique algorithm to create and define a computing space that is represented by the node.

Figure 3:
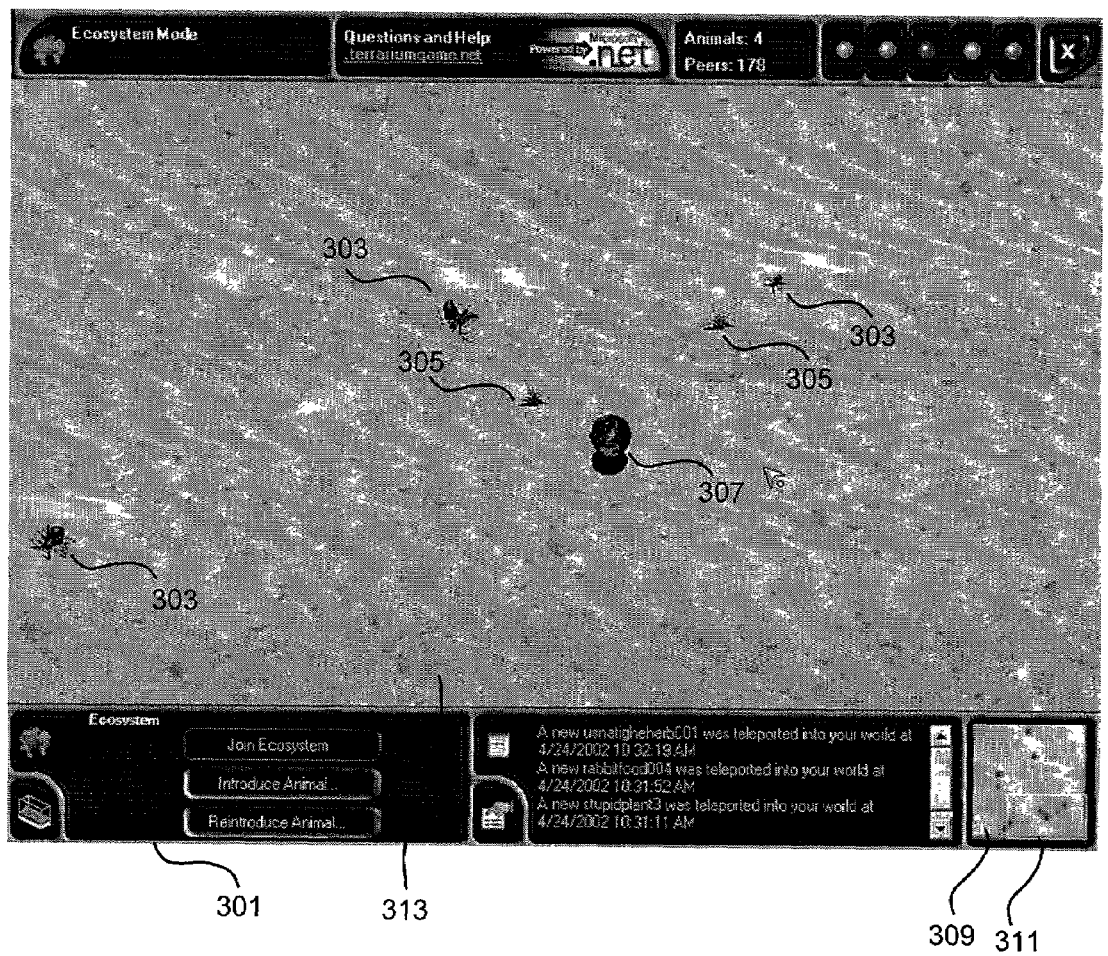
FIG. 3 illustrates a screenshot of a user interface for an unbounded computing space used as an unbounded gaming application according to an illustrative embodiment of the invention.

In one illustrative example, with reference to FIG. 3, nodes may represent physical terrain in a virtual world. FIG. 3 illustrates a user interface for a terrain node 301 that is part of an unbounded computing space that interacts to play a game. Each independent agent 303, 305 may represent an animal or plant that lives and grows (and potentially dies) on the terrain in the virtual world, and that may be transported from one terrain node to another terrain node. Another independent agent 307 might execute only on the terrain node on which it is initially introduced and launched. In this example, independent agent 307 represents a sphere that randomly travels around the terrain of its local terrain node and, upon hitting an independent agent representing an animal or plant, causes the local terrain node to "teleport" the animal or plant to another random terrain node within the unbounded computing space by copying the independent agent to another terrain node along with the current state information of the independent agent. FIG. 3 illustrates only a portion of the terrain of the terrain node 301. Map 309 illustrates the entire terrain located on terrain node 301, and box 311 indicates the visible portion shown in window 313.

In another example, each node may be defined to allow diagnostic functions to execute on the computer system on which each node is located. That is, an independent agent may perform a diagnostic service on the computer system on which the node is located. For example, an independent agent named Defragger, upon being introduced on or copied to a diagnostic node, may check to determine a fragmentation level of one or more local hard drives. When the fragmentation level is above a predefined threshold, Defragger may launch a defragmentation utility on the local computer to defragment the identified hard drive. Similarly, an independent agent named SpaceMaker, upon being introduced on or copied to a diagnostic node, may check to determine how much space is available on the local hard drives of the computer on which the diagnostic node is located. When the amount of available space is below a predefined amount (or percentage of total space available), SpaceMaker may automatically (optionally upon confirmation by a user) delete files known not to be needed, such as temporary files, cache files, and the like.

As is illustrated above, because each node can use a different algorithm, each node can serve a different purpose than other nodes, and can allow different tasks than other nodes allow. In one illustrative embodiment, nodes of differing types communicate with each other in a global unbounded computing space, e.g., through the use of a common port on each computer system. Before sending an independent agent from one node to another, the nodes may communicate to determine whether the independent agent is compatible with the node to which it is being sent (e.g., an independent agent of the animal type illustrated above cannot successfully run on a diagnostic node). When a node of one type sends an agent meant for execution on a node of a second type, the receiving node may still execute the agent in order to read parameter information associated with the agent. Upon detecting that the agent is meant for another type of node, the receiving node may stop execution of the agent.

In an alternative illustrative embodiment, unbounded computing spaces of different types are kept separate, and nodes of one type are unaware of and do not communicate with nodes of another type. In this illustrative embodiment, communications may be kept separate through the use of separate ports on a machine, or any other known technique. For example, a machine identified by IP address 1.2.3.5 may have a terrain node accessible at 1.2.3.5:50000, while a diagnostic node on the same machine may be accessible at 1.2.3.5:50001.

Each node may include parameter definitions that vary from node to node, e.g., indicating the node's type, terrain size and definition (when applicable), types of agents allowed, number of independent agents that can execute simultaneously, and the like. Each node also provides security so that independent agents cannot perform malicious acts on the node's local computer system. The security parameters and controls may be stored in a security module that executes in or as part of the node module. In one illustrative embodiment, each node is executed in a managed code environment, such as Common Language Runtime (CLR) and the .NET framework, or Java Virtual Machine. Any managed code environment providing similar security mechanisms may alternatively be used.

Running each node in a managed code environment allows each node to use the environment's security policy measures to sandbox independent agents (i.e., restrict independent agents from performing malicious acts on the computer system). That is, each node can define a security policy in such a manner so as to allow independent agents to perform only non-malicious acts when executing on the local computer system, based on a predefined security policy manager provided by the managed code environment. The security policy may be defined on a per-agent basis (i.e., each independent agent may have a differing security policy), may be defined on a group basis (i.e., each agent belonging to a specified group has the same security policy), or may be defined globally (i.e., all independent agents have the same security policy). Using the various security policy definition levels, a node can provide one or more security policies to one or more independent agents, including independent agents unknown at the time the security policy is defined.

With reference back to FIG. 2, each node 201, 211, 221, 231, 241 includes a discovery module 203, 213, 223, 233, 243, respectively. The discovery module can detect other nodes that are a part of the unbounded computing space, and may also maintain a list of other nodes that are available to receive an independent agent.

In one illustrative embodiment, each discovery module may communicate with a central server 253 that maintains a list of active nodes in the unbounded computing space 200. Each new node, upon initialization, may register with the server 253 and obtain a list of active nodes within the unbounded computing space 200. Each node may subsequently receive an updated list of active nodes in predetermined intervals (e.g., every 2 minutes, 5 minutes, 15 minutes, etc.). According to one aspect of the invention, server 253 may provide to a requesting node a list of the n closest nodes to the requesting node, and also provide the total number of registered nodes. According to another aspect, server 253 may provide a complete list of active nodes to a node upon request.

In another illustrative embodiment, no central server is used. Instead, a peer-to-peer detection scheme may be used to discover other nodes. In this embodiment, a node 201 may broadcast an undirected discovery request over the network 251, e.g., by sending a network broadcast specifying a specific HTTP port without specifying a specific recipient, as is generally known in the art. When another node, e.g., node 211, receives the broadcast, it sends a response to the broadcasting node 201 indicating its presence in the unbounded computing space. Once the broadcasting node 201 receives the response, it can determine the network address of the other node 211, and can communicate with node 211 to learn about still other nodes of which node 211 is aware, e.g., nodes 221, 231, and/or 241. This process can be repeated until node 201 is either aware of every node in the UCS 200, or is aware of at least a predetermined number or percentage of nodes in the UCS 200, as defined by the detection module.

Each node also includes an interaction module that coordinates communication and independent agent transmissions among nodes. The interaction module defines the common way in which each node communicates with other nodes by defining an information passing protocol that is used throughout the unbounded computing space, as well as an agent passing protocol that is used to transfer independent agents from one node to another. In an alternative embodiment, information and agent passing may be performed by a single protocol.

The information passing protocol is used to pass environment information from one node to another. Environment information may include information such as runtime version, knowledge of certain types of independent agents, and the like. Knowledge of a certain independent agent may be useful because if node 201 is already storing a copy of a specific independent agent, e.g., the SpaceMaker independent agent, then there is no need for another node 211 to duplicatively send another copy. Instead, when node 211 informs node 201 that node 211 is going to send the SpaceMaker independent agent, node 201 indicates to node 211 that node 201 is already aware of the SpaceMaker independent agent, authenticates the preexisting copy of the SpaceMaker independent agent, and executes the preexisting copy of the SpaceMaker independent agent when authenticated successfully.

In one illustrative embodiment of the invention, the interaction module uses a hypertext transport protocol (HTTP) server to perform information and agent passing among nodes via extensible markup language (XML) messages. The interaction module may use the HTTP POST feature to upload an independent agent from one node to another, e.g., by using a specific port identifier. One of skill in the art will appreciate that other communications protocols may be used for node communications and independent agent transmissions. For example, an interaction module may alternatively use a TCP (Transmission Control Protocol) connection between peers in combination with the serialization mechanism provided in Common Language Runtime (CLR) to exchange information between nodes. In yet another embodiment an independent agent may be stored on a removable disk (e.g., a floppy disk), which is transported to another computer system acting as a node, and the independent agent is loaded from the removable disk. Any other protocol that provides a standard way to exchange information and code can alternatively be used. Preferably, the selected protocol should understand and account for evolving nodes. That is, the protocol should (but is not required to) communicate with older nodes that do not necessarily include all the functions of the latest node software.

Figure 4:
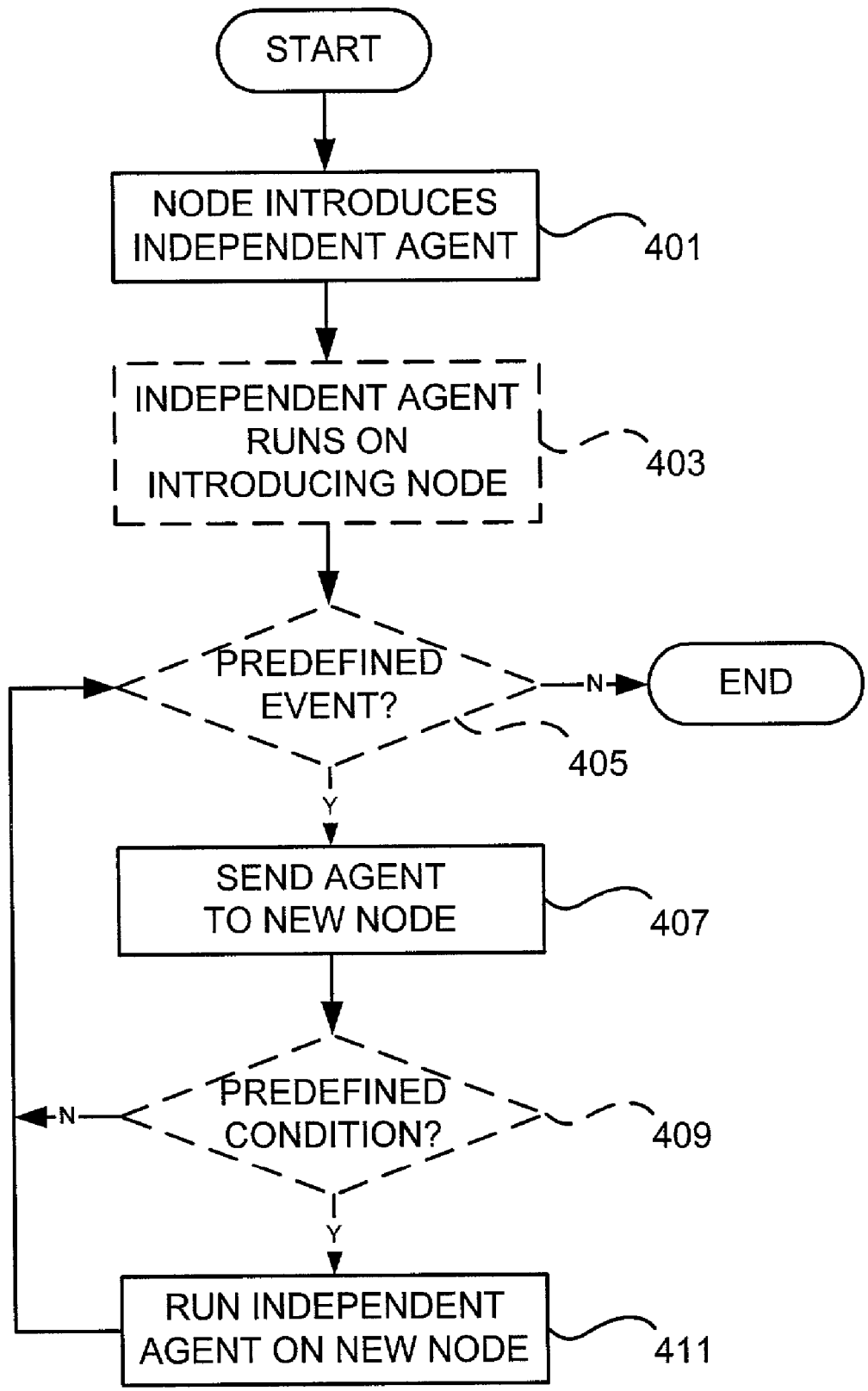
FIG. 4 illustrates a method for executing an independent agent in an unbounded computing space according to an illustrative embodiment of the invention.

With reference to FIG. 4, using the above-described unbounded computing space, any node can introduce an independent agent that can potentially run on any other node within the unbounded computing space. In step 401, an introducing node, e.g., node 201 in FIG. 2, introduces an independent agent. Node 201 may introduce the independent agent by loading the independent agent within the execution environment defined by node 201. Optionally, in step 403, node 201 executes the introduced independent agent. In step 405, also optional, node 201 may wait for a predefined event to occur, prior to sending or copying the independent agent to a new node in step 407. If the predefined event never occurs, the independent agent might not be transferred to another new node. The predefined event may be the occurrence of any event or the satisfaction of any condition as defined by a user or program. For example, the predefined event may be as simple as the satisfaction of the condition that there is another node in the computing space in which the independent agent has not yet been run, and the present node may send the independent agent to that node in step 407. That is, the independent agent may store historical data regarding nodes which the agent has visited and/or which have executed the agent. The present node may compare the historical data to the present node's list of other nodes of which it is aware, and the present node may send the independent agent to a node of which it is aware that the agent has not yet visited and/or on which the agent has been executed.

As another example, the predefined event may be the occurrence of an event, such as a local process independently determining that the independent agent should be sent to a new node, e.g., independent agent 307 "hitting" a plant or animal independent agent as illustrated above. Alternatively, node 201 may send the independent agent to a new node in step 407 without waiting for a predefined event or may select a node at random to which the independent agent is sent.

In step 407, node 201 sends a copy of the independent agent to a new node, e.g., node 211. Node 201 may or may not delete its local copy of the independent agent. Node 201 may or may not include the independent agent's state information when sending to node 211, depending on the design and purpose of the independent agent. If the agent is being "teleported" from one node to another, state information may be included. However, if the agent is performing diagnostic services, state information might not be included so that the independent agent can start from a newly initialized state on each node. Alternatively, some state information may be copied from one node to another in order to track and keep a historical record of the activities of the independent agent (e.g., number of nodes on which it has executed, age since creation, average fragmentation of hard drives, and other statistical and descriptive information).

In step 409, the node receiving the independent agent optionally checks for the presence of or waits for a predefined condition to occur in step 409 prior to running the independent agent in step 411. The predefined condition may include any user or program defined condition, such as hard drive fragmentation above a certain threshold, available hard drive space below a certain threshold, and the like. The predefined condition may be provided by either the agent itself or the node to which it was sent. After running the independent agent in step 411, the present node (node 211) may return to step 405 and wait or check for the predefined event associated with that independent agent (or a different predefined event), or may skip step 405 and continue immediately to step 407 and send the independent agent to yet another node (e.g., back to node 201, or to a new node 221, 231, 241).

While the invention has been primarily described as an unbounded computer space, in an alternative illustrative embodiment a grid computing architecture can be modified to allow any person (or machine), even an untrusted person (or machine), to introduce programs into the computing space. Each node in the grid computing architecture can use CLR code access security, or any similar security model, to safely execute software, including software submitted by an untrusted party.

Using any of the above-described models, e.g., the unbounded computing space or modified grid computing architecture, work can be performed in a distributed manner without using a central server to coordinate each task. For example, when a user or program determines that a primary task could be performed more quickly if the primary task were distributed among multiple computers, the user (or program) may create an independent agent that, when introduced at a node, coordinates the performance of the task across one or more systems in the entire computing space (e.g., by sending independent agents containing sub-tasks to other nodes). That is, the unbounded computing space acts as a "supercomputer" by treating each node in the unbounded computing space as a processor, and allowing users to submit programs that can run independent but coordinated tasks on several of the nodes. Any user (even untrusted users) can submit programs for execution on the supercomputer, e.g., programs that get more accurate or more detailed with more processors. For example, a user may submit an independent agent that models traffic, and each node computer behaves like an automobile. Adding more nodes to the unbounded computing space allows the agent to model a larger road as a result of having more "cars" to work with.

In an illustrative embodiment, a primary independent agent introduced in a coordinating node may generate derivative independent agents that, when sent to other nodes, each performs a sub-task of the primary task, or each equally interact to accomplish a joint task. The original independent agent or the derivative independent agents may be programmed to check for predetermined criteria prior to sending one of the derivative independent agents to another node. For example, an agent may check to determine that the other node's processor utilization level is below a predetermined threshold to ensure that the derivative agent will not interfere with other programs executing on the other node, or an agent may check to verify that the other node has a specific resource that is required in order to complete the sub-task. Thus, any node in the unbounded computing space (or modified grid computing architecture) can dynamically act as a coordinator for a given task performed or distributed across the system, without requiring that the coordinating node has any special central authority or privileges, because each node in the system ensures that agent programs do not perform malicious behavior as defined by each node's security policy. Each node that performs the task (or a portion of the task) may send results back to the coordinating node, as specified by the derivative independent agent(s) sent to the other nodes.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A distributed computing architecture, comprising:
a plurality of node modules in which agent programs can run, each node module comprising:
security module using code access security to execute an agent program in a sandboxed environment regardless of an identity of a source of a source of the agent program;
a discovery module that detects other node modules within the distributed computing architecture; and
an interaction module through which each node module communicates with other node modules,
wherein each node module is capable of introducing the agent program that can be sent to one or more other node modules, via the interaction module, and run in the one or more other node modules.

2. The distributed computing architecture of claim 1, wherein a discovery module of a first node communicates with a server that maintains a database of active node modules.

3. The distributed computing architecture of claim 1, wherein a discovery module of a first node broadcasts an undirected request over a network to detect other active node modules.

4. The distributed computing architecture of claim 1, wherein each node module executes in a managed code environment.

5. The distributed computing architecture of claim 4, wherein the managed code environment comprises Common Language Runtime.

6. The distributed computing architecture of claim 4, wherein the managed code environment comprises a Java virtual machine.

7. The distributed computing architecture of claim 1, wherein each interaction module communicates with other node modules using HTTP messages.

8. The distributed computing architecture of claim 1, wherein each interaction module communicates with other node modules using TCP messages.

9. The distributed computing architecture of claim 1, wherein each node module defines virtual terrain, and each agent program defines a virtual terrain inhabitant.

10. The distributed computing architecture of claim 1, wherein the agent program coordinates a distributed task across the plurality of code modules.

11. A method for executing a program on a computer system, comprising:

(a) introducing an agent program into a first node of a plurality of nodes, wherein each node provides a secure environment in which the agent program can run;
(b) detecting a second node of the plurality of nodes;
(c) sending the agent program to the second node, wherein the first node retains no expectation of a return of the agent program to the first node; and
(d) executing the agent program in the secure environment of the second node, wherein each secure environment comprises a security module using code access security to execute the agent program in a sandboxed environment regardless of an identity of a source of the agent program.

12. The method of claim 11, wherein step (b) comprises:
(i) sending to a server a node list request; and
(ii) receiving from the server a list of active nodes.

13. The method of claim 11, wherein step (b) comprises broadcasting an undirected request over a network.

14. The method of claim 11, wherein step (c) comprises sending an HTTP message to the second node.

15. The method of claim 14, wherein in step (c) the HTTP message comprises POST data.

16. The method of claim 11, wherein step (c) comprises sending an XML message to the second node.

17. The method of claim 11, wherein step (d) comprises performing a diagnostic service on a local computer system.

18. The method of claim 17, wherein step (d) comprises:
(i) detecting an amount of available space in a storage device;
(ii) when the detected amount of available space is below a predetermined level, deleting unnecessary files meeting predefined criteria.

19. The method of claim 17, wherein step (d) comprises:
(i) detecting a level of file fragmentation in a storage device;
(ii) when the detected level of file fragmentation is above a predetermined level, initiating a defragmentation procedure on the storage device.

20. The method of claim 11, wherein further comprising the step of executing the agent program in the first node, wherein the agent program coordinates a distributed task across at least the first and second nodes.

21. In a computing architecture comprising a plurality of nodes that are capable of executing agent programs, and wherein each node comprises a security module using code access security to execute agent programs in a sandbox environment, a detection module that detects other nodes in the computing architecture, and an interaction module that communicates with other nodes in the computing architecture, a method for distributing agent programs, comprising:
(a) introducing a first agent program by a first node of the plurality of nodes;
(b) according to a predetermined algorithm, determining a second node to which the first agent program should be sent;
(c) sending the first agent program to the second node, without retaining an expectation of a return of the first agent program to the first node of the plurality of nodes;
(d) introducing a second agent program by a third node of the plurality of nodes;
(e) according to the predetermined algorithm, determining a fourth node to which the second agent program should be sent; and
(f) sending the second agent program to the fourth node, without retaining an expectation of a return of the second agent program to the third node of the plurality of nodes.

22. The method of claim 21, wherein the predetermined algorithm comprises selecting a fourth node to which the agent program has not yet been sent.

23. The method of claim 21, wherein the predetermined algorithms comprises randomly selecting a fourth node.

24. A computer architecture comprising a first plurality of computing nodes, wherein any node within the first plurality of computing nodes is capable of introducing a program agent and sending the program agent to any other node within the first plurality of computing nodes, where the program agent subsequently runs in a sandboxed environment using code access security, wherein the sending node does not retain an expectation of a return of the program agent.

25. The computer architecture of claim 24, wherein the computer architecture consists of the first plurality of nodes.

26. The computer architecture of claim 24, further comprising a second plurality of computing nodes, wherein any node within the second plurality of computing nodes is capable of introducing a second program agent and sending the second program agent to any other node within the second plurality of computing nodes, where the second program agent subsequently runs.

27. A method for performing a task across a distributed computer system, comprising:
(a) introducing an agent program into a first node of a plurality of nodes, wherein each of the plurality of nodes provides a secure sandboxed environment in which the agent program can run and is capable of receiving the agent program;
(b) dividing a task defined by the agent program into a plurality of sub-tasks;
(c) creating a plurality of derivative agent programs, wherein each derivative agent program is based on one sub-task of the plurality of sub-tasks; and
(d) sending each of the plurality of derivative agent programs to different nodes of the plurality of nodes.

28. The method of claim 27, wherein a selection of the different nodes is based on predetermined criteria.

29. The method of claim 28, wherein the predetermined criteria comprises a processor utilization level below a predetermined threshold.

30. The method of claim 28, wherein the predetermined criteria comprises a predetermined resource.

* * * * *